United States Patent
Gardiner

(10) Patent No.: US 10,651,891 B1
(45) Date of Patent: May 12, 2020

(54) ADAPTIVE HOPPING EQUALIZER

(71) Applicant: Raytheon Company, Waltham, MA (US)

(72) Inventor: Thomas E. Gardiner, St. Petersburg, FL (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/506,288

(22) Filed: Jul. 9, 2019

(51) Int. Cl.
*H04B 1/7143* (2011.01)
*H04B 1/7156* (2011.01)
*H04B 1/715* (2011.01)
*H04B 7/26* (2006.01)

(52) U.S. Cl.
CPC .......... *H04B 1/7143* (2013.01); *H04B 1/715* (2013.01); *H04B 1/7156* (2013.01); *H04B 7/2621* (2013.01); *H04B 2001/7154* (2013.01); *H04B 2001/71563* (2013.01)

(58) Field of Classification Search
CPC ......... H04L 25/03006; H04L 25/03019; H04L 25/03885; H04L 27/01; H04L 5/0012; H04B 1/7143; H04B 1/7156
See application file for complete search history.

(56) References Cited

U.S. PATENT DOCUMENTS

| | | | |
|---|---|---|---|
| 2006/0056554 A1* | 3/2006 | Lin | H04B 1/28 375/350 |
| 2015/0222322 A1* | 8/2015 | Moffatt | H04L 25/03057 375/136 |

* cited by examiner

*Primary Examiner* — Kevin Kim
(74) *Attorney, Agent, or Firm* — Daly Crowley Mofford and Durkee

(57) ABSTRACT

According to aspects of the disclosure, a method is disclosed comprising: detecting a first hop to a first frequency in a hopping sequence, the first hop being performed by a transmitter in accordance with the hopping sequence; identifying a weighting vector that corresponds to a second frequency in the hopping sequence; obtaining an equalizer vector for the second frequency based on the weighting vector and an equalizer matrix, the equalizer matrix including a plurality of equalizer vectors, each equalizer vector corresponding to a different frequency in the hopping sequence; detecting a second hop from the first frequency to the second frequency, the second hop being performed by the transmitter in accordance with the hopping sequence; receiving a signal that is transmitted by the transmitter at the second frequency; and equalizing the signal by using the equalizer vector for the second frequency.

20 Claims, 5 Drawing Sheets

| 214 |
| --- |

| $f_1$ (101 MHz) | $g_{1,1}, g_{1,2}, \ldots g_{1,n}$ | 310-1 |
| --- | --- | --- |
| $f_2$ (102 MHz) | $g_{2,1}, g_{2,2}, \ldots g_{2,n}$ | 310-2 |
| $f_3$ (103 MHz) | $g_{3,1}, g_{3,2}, \ldots g_{3,n}$ | 310-3 |
| $\vdots$ | | |
| $f_m$ (111 MHz) | $g_{m,1}, g_{m,2}, \ldots g_{m,n}$ | 310-m |

# ADAPTIVE HOPPING EQUALIZER

BACKGROUND

Frequency-hopping spread spectrum (FHSS) refers to techniques for transmitting radio signals by rapidly switching a carrier signal among many frequency channels, using a pseudorandom sequence known to both transmitter and receiver. Frequency-hopping signals are resistant to narrowband interference, difficult to intercept, and can share a frequency band with many types of conventional transmissions with minimal interference. On the receiver end, frequency-hopping signals can be equalized to reverse distortion incurred by the frequency-hopping signals during their transmission. One challenge of equalizing frequency-hopping signals is identifying an equalizer that performs well over the entire hopping-range at which the frequency-hopping signals are transmitted.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is disclosed comprising: detecting a first hop to a first frequency in a hopping sequence, the first hop being performed by a transmitter in accordance with the hopping sequence; identifying a weighting vector that corresponds to a second frequency in the hopping sequence; obtaining an equalizer vector for the second frequency based on the weighting vector and an equalizer matrix, the equalizer matrix including a plurality of equalizer vectors, each equalizer vector corresponding to a different frequency in the hopping sequence; detecting a second hop from the first frequency to the second frequency, the second hop being performed by the transmitter in accordance with the hopping sequence; receiving a signal that is transmitted by the transmitter at the second frequency; and equalizing the signal by using the equalizer vector for the second frequency.

According to aspects of the disclosure, a system is disclosed comprising: a memory configured to store an equalizer matrix including a plurality of equalizer vectors, each equalizer vector corresponding to a different frequency in a hopping sequence; and a processing circuitry operatively coupled to the memory, the processing circuitry being configured to perform the operations of: detecting a first hop to a first frequency in the hopping sequence, the first hop being performed by a transmitter in accordance with the hopping sequence; identifying a weighting vector that corresponds to a second frequency in the hopping sequence, the weighting vector being arranged to interpolate two or more of the equalizer vectors in the equalizer matrix when none of the equalizer vectors in the equalizer matrix corresponds to the second frequency; obtaining an equalizer vector for the second frequency based on the weighting vector and the equalizer matrix; detecting a second hop from the first frequency to the second frequency, the second hop being performed by the transmitter in accordance with the hopping sequence; receiving a signal that is transmitted by the transmitter at the second frequency; and equalizing the signal by using the equalizer vector for the second frequency.

According to aspects of the disclosure, a non-transitory computer-readable medium is disclosed that is configured to store one or more processor-executable instructions, which when executed by at least one processor cause the at least one processor to perform the operations of: detecting a first hop to a first frequency in a hopping sequence, the first hop being performed by a transmitter in accordance with the hopping sequence; identifying a weighting vector that corresponds to a second frequency in the hopping sequence; obtaining an equalizer vector for the second frequency based on the weighting vector and an equalizer matrix, the equalizer matrix including a plurality of equalizer vectors, each equalizer vector corresponding to a different frequency in the hopping sequence; detecting a second hop from the first frequency to the second frequency, the second hop being performed by the transmitter in accordance with the hopping sequence; receiving a signal that is transmitted by the transmitter at the second frequency; and equalizing the signal by using the equalizer vector for the second frequency.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

According to aspects of the disclosure, an adaptive hopping equalizer is disclosed, which is configured to equalize frequency-hopping signals that are received from a transmitter. At any given time of its operation, the adaptive hopping equalizer may equalize the signals by using a set of equalizer taps that are selected specifically for the current hopping frequency of the transmitter. The set of equalizer taps for any given frequency in the hopping range of the transmitter may be calculated dynamically, by the adaptive hopping equalizer, the first time the given frequency is used by the transmitter. The set of equalizer taps for the given frequency may then and stored in memory for further use in the future. Moreover, during its use, the set of equalizer taps may be gradually updated by the equalizer to improve its accuracy.

Figure 1:
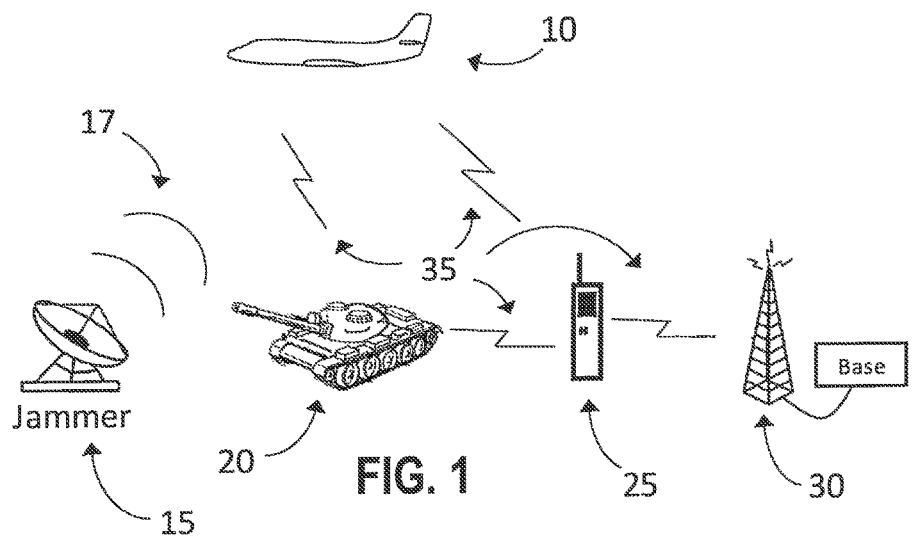
FIG. 1 is a diagram of an example of a communications system that includes an adaptive hopping equalizer, according to aspects of the disclosure.

Referring to FIG. 1, an illustrative block diagram of channels of communication and jamming between mobile and fixed platforms is shown. In a common scenario involving frequency-hopping communications, various communication devices (e.g., a handheld radio 25) within both mobile and stationary platforms including, for example, a plane 10, tank 20, and base 30 are pre-configured to utilize an established frequency-hopping waveform such as SINCGARS. The various communication devices can then communicate via frequency-hopping signals 35 between each other.

Figure 2:
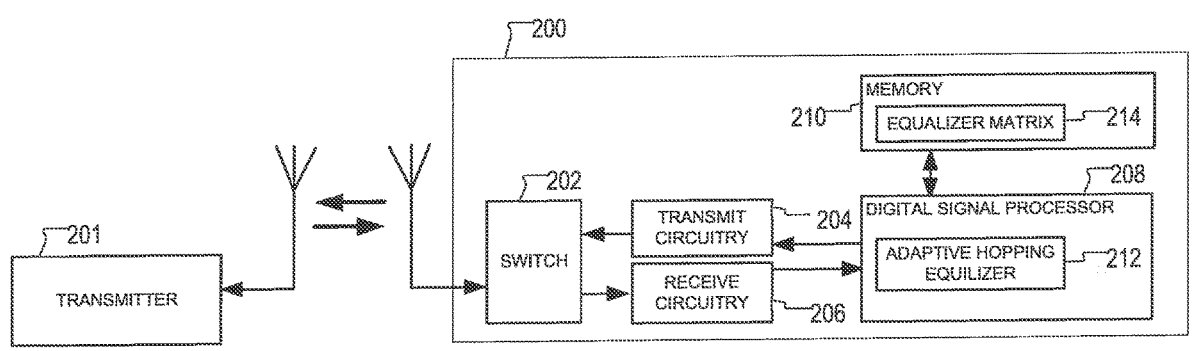
FIG. 2 is a diagram of an example of another communications system that includes an adaptive hopping equalizer, according to aspects of the disclosure.

FIG. 2 is a diagram of a transmit-receive system, which may be used to establish a frequency-hopped communications link between a transmitter 201 and a receiver 200. The receiver 200 may include an antenna, a switch 202, a receive circuitry 204, a transmit circuitry 206, a digital signal processor 208, and a memory 210 that is operatively coupled to the digital signal processor 208.

The switch 202 may comprise any suitable combination of hardware (e.g., circuitry) and/or software that enables the antenna to be used for both transmitting RF signals into free space and receiving RF signals from free space. The transmit circuitry 204 may include any suitable combination of hardware (e.g., circuitry) and/or software, and it may be configured to receive a digital signal from the digital signal processor 208, convert the digital signal to an analog signal, and provide the analog signal to the switch 202 for RF transmission. The receive circuitry 206 may be configured to receive a digital signal from the digital signal processor 208, convert the digital signal to an analog signal, and provide the analog signal to the switch 202 for RF transmission. In this regard, the transmit circuitry 206 may include any suitable type of electronic circuitry (and/or software) for receiving RF signals from the switch 202, dehopping the received signals, digitizing the dehopped signals, and providing the dehopped signals (in digital form) to the processor 208. The processor 208 may be configured equalize the dehopped signals, as well as perform further processing on the dehopped signals.

The processor 208 may include one or more of an Application-Specific Integrated Circuit (ASIC), a Field-Programmable Gate Array (FPGA), a general-purpose processor, and/or any other suitable type of processing circuitry. The memory 210 may include any suitable type of volatile and/or non-volatile memory, such as EEPROM memory, flash memory, read-only memory (ROM), or random access-memory. The processor 208 may be configured to implement an adaptive hopping equalizer 212 for equalizing dehopped signals that are provided to the processor 208 by the receive circuitry 206. The memory 210 may be configured to store an equalizer matrix 214 that is arranged to store equalizer vectors used by the adaptive hopping equalizer 212 for equalizing the dehopped signals. The operation of the adaptive hopping equalizer 212 is discussed further below with respect to FIGS. 3-6C.

FIG. 2 is provided for illustrative purposes only. Although in the present example the adaptive hopping equalizer 212 is implemented in software, alternative implementations are possible in which the adaptive hopping equalizer is implemented in hardware or as a combination of hardware and software. Although in the example of FIG. 2, the adaptive hopping equalizer 212 is integrated into the processor 208, alternative implementations are possible in which the adaptive hopping equalizer 212 is provided separately from the processor 208. Although in the example of FIG. 2 the receive circuitry 206 is depicted as a monolithic block, it will be understood that receive circuitry 206 may include various electronic components, such as an analog-to-digital converter, a baseband processor, a mixer, etc. Although in the example of FIG. 2 the transmit circuitry 204 is depicted as a monolithic block, it will be understood that transmit circuitry 204 may include various electronic components, such as a digital-to-analog converter, a baseband processor, a mixer, etc. Although in the example of FIG. 2, the transmit circuitry 204 and the receive circuitry 206 are depicted as separate entities, it will be understood that alternative implementations are possible in which the transmit circuitry 204 and the receive circuitry 206 are at least partially integrated with one another.

Figures 3, 4:
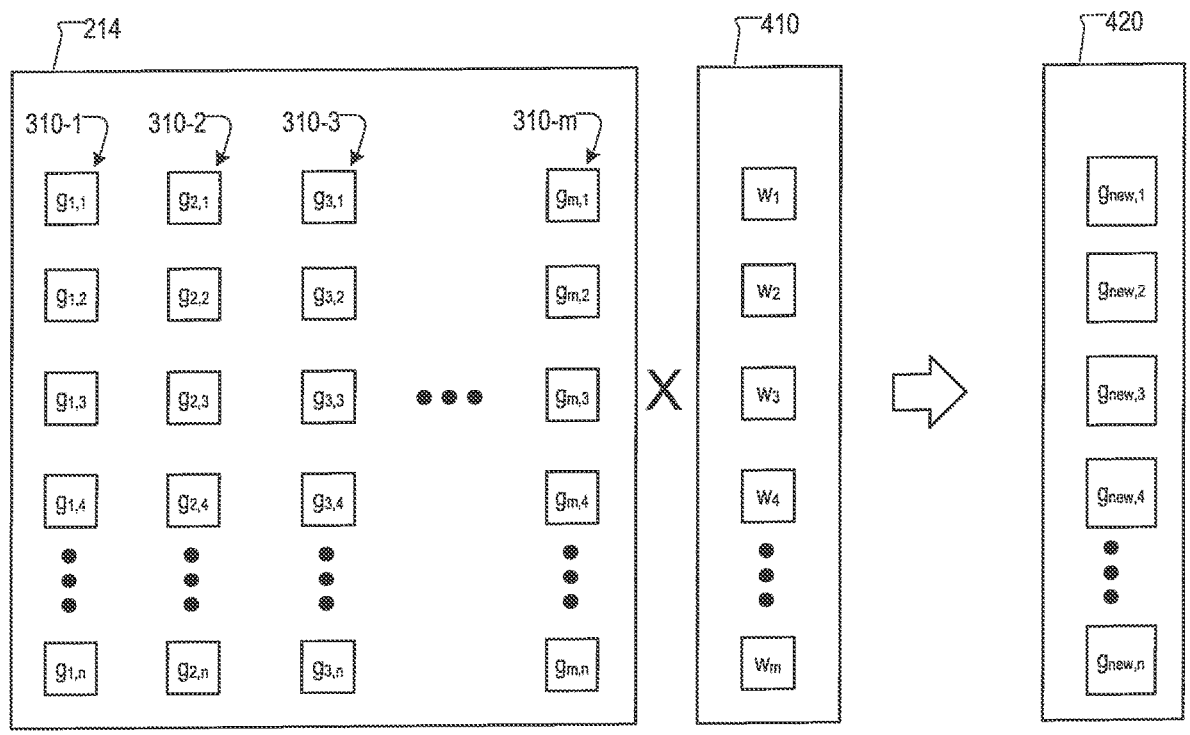
FIG. 3 is a diagram of an example of an equalizer matrix that is used by the adaptive hopping equalizer of FIG. 2, according to aspects of the disclosure.
FIG. 4 is a diagram illustrating the use of the equalizer matrix of FIG. 3 to obtain equalizer vectors, according to aspects of the disclosure.

FIG. 3 is a diagram showing the equalizer matrix 214 in further detail. As illustrated, the equalizer matrix 214 may include M equalizer vectors 310, wherein M is a positive integer greater than or equal to one. Each of the equalizer vectors 310 may include an ordered sequence of N equalizer taps (e.g., coefficients), where N is a positive integer greater than one. Each of the equalizer vectors 310 may correspond to a different frequency in a set of frequencies F. According to the present example, the set of frequencies F includes the frequencies {101 MHz, 102 MHz, 103 MHz, 104 MHz, 105 MHz, 106 MHz, 107 MHz, 108 MHz, 109 MHz, 110 MHz, 11 MHz}. In this regard, the equalizer vector 310-1 may correspond to a frequency of 101 MHz; the equalizer vector 310-2 may correspond to a frequency of 102 MHz; the equalizer vector 310-3 may correspond to a frequency of 103 MHz; and the equalizer vector 310-$m$ may correspond to a frequency of 111 MHz. According to the present disclosure, a frequency is represented in matrix 214 when the matrix 214 includes an equalizer vector 310 that corresponds to the frequency. According to the present example, the equalizer matrix 214 includes 11 equalizer vectors. However, it will be understood that that the present disclosure is not limited to any specific number of equalizer vectors being included in the equalizer matrix 214.

FIG. 4 is a diagram illustrating the use of the equalizer matrix 214 by the adaptive hopping equalizer 212 to calculate an equalizer vector 420. Specifically, FIG. 4 shows that the equalizer matrix 214 may be used to calculate the equalizer vector 420 by multiplying the equalizer matrix 214 with a weighting vector 410. The weighting vector 410 may be specific to one of the frequencies in the hopping range of the transmitter 201 (hereinafter "frequency $f_z$"). And the equalizer vector 420 may also be specific to the frequency $f_z$. In other words, for each frequency in the hopping range of the transmitter 201, the adaptive hopping equalizer 212 may use a different weighting vector 410 (which corresponds to that frequency) to calculate a respective equalizer vector 420 that corresponds to the frequency $f_z$. The respective equalizer vector 420 may be subsequently used by the adaptive hopping equalizer 212 to equalize signals transmitted at this frequency. Using a different equalizer vector 420 for each hopping frequency in the hopping range of the transmitter 201 is advantageous because it may help increase the accuracy of the adaptive hopping equalizer 212.

The equalizer vector 420 may include the values of a set of equalizer taps g used by the adaptive hopping equalizer 212 to equalize signals that are received from the transmitter 201. Additionally or alternatively, in some implementations, to equalize the signals, the adaptive hopping equalizer 212 may use a finite impulse response (FIR) filter that is based on the equalizer taps in the equalizer vector 420. The FIR filter may convolve (dehopped) signals received from the transmitter 201 with the equalizer tap values. Throughout the disclosure, the terms "equalizer tap" and "equalizer tap values" may be used interchangeably, when the context permits. Additionally or alternatively, in some implementations, the equalizer vector 420 may include any suitable set of parameters for controlling the equalization of a signal. For example, in some implementations, the parameters may specify gains applied to a bank of filters, pole zero locations, etc. Stated succinctly, the present disclosure is not limited to any specific type of equalizer vector.

Each row in the equalizer matrix 214 may define a function for the values of a particular equalizer tap across a set of discrete frequencies F. For example, the first row in the matrix 214 may define a first function for the values of a first equalizer tap in the set of equalizer taps, across the set F; the second row in the matrix 214 may define a second function for the values of a second equalizer tap in the set of equalizer taps, across the set F; the third row in the equalizer matrix 214 may define a third function for the values of a third equalizer tap in the set of equalizer taps, across the set F; and the n-th row in the equalizer matrix 214 may define an n-th function for the values of the n-th equalizer tap in the set of equalizer taps, across the set F.

The weighting vector 410 may be configured to interpolate and/or smoothen each of the functions to calculate equalizer tap values that correspond to the frequency $f_z$, when the frequency $f_z$ is not part of the set F. In some implementations, when the frequency $f_z$ is part of the set F, the weighting vector 410 may be configured to extract one of the equalizer vectors 310 from the matrix 214, effectively causing the equalizer vector 420 to equal the extracted equalizer vector 310. As noted above, for each frequency in the hopping range of the transmitter 201, weighting vector 410 may have a different value, which permits the weighting vector 410 to be used for the derivation of an equalizer vector 420 that is specific to the same frequency. Alternatively, in implementations in which the weighting vector 410 implements a smoothing function, applying the weighting vector may never return an exact copy of one of the rows in the matrix 214.

The weighting vector 410 may include a plurality of weights w, such that the sum of the weights w is 1 (i.e., unity). The values of the weights w may implement any suitable type of weighting function, such as a linear interpolator, a second-order interpolator, a third-order interpolator, a smoothing function, and an exponential function. It will be understood that the present disclosure is not limited to using any specific weighting function for calculating the weighting vector 410.

Examples are now provided of several weighting functions that can be used to calculate the weighting vector 410. As noted above, different values of equalizer taps are stored as matrix 214, which is dimensioned N equalizer taps (rows) by M frequency bins (columns). The equalizer taps are numbered 1 . . . N. The frequency bins are numbered 1 . . . M, representing the frequencies in the set F. A given frequency f in the hopping range of the transmitter 201 may or may not be represented in the matrix 214. If the hopping band is 100-110 MHz, and M=11, the set F of frequencies that are represented in the matrix 214 may include {101, 102, 103, 104, 105, 106, 107, 108, 109, 110, 111}.

For example, when the frequency f is part of the set F (i.e., when the frequency F is represented in the matrix 214), the frequency F may have a value of 101 MHz. In such instances, the weighting vector 410 may have the form {1, 0, 0, 0, 0, 0, 0, 0, 0, 0, 0}. Applying the weighting vector W to the matrix 214 may result in effectively extracting the equalizer vector 310-1 from matrix 214, and causing the equalizer vector 420 to equal the equalizer vector 310-1.

As another example, when the frequency f is not part of the set F (i.e., when the frequency F is not represented in the matrix 214), the weighting frequency f may be equal to 102.1 MHz. As can be readily appreciated, this frequency falls between frequency 102 MHz and frequency 103 MHz. To find the equalizer vector 420 for the frequency f, the weighting vector 410 can have the form {w(f, 1), w(f, 2), w(f, 3) . . . w(f, M)}, where: the sum of the weights w is unity. The values of the weights w that constitute the weighting vector may be resolved in accordance with any suitable type of weighting function, such as a linear interpolator, a second-order or higher-order interpolator, or a smoothing function.

For example, in some implementations, the weights w of the weighting vector 410 may be resolved in accordance with a linear interpolator. The linear interpolator may use two frequencies $f_A$ and $f_{A+1}$ on either side of f, such that $f_A < f < f_{A+1}$, and a value x is defined in accordance with Equation 1 below:

$$x = \frac{(f - f_A)}{f_{A+1} - f_A} \quad \text{(Eq. 1)}$$

In accordance with this arrangement, all weights w in the weighting vector W may be equal to zero, except for weights $g_A$ and $g_{A+1}$, which are defined by Equations 2-3, as follows:

$$g_A = 1 - x \quad \text{(Eq. 2)}$$

$$g_{A+1} = x \quad \text{(Eq. 3)}$$

For example, if f=102.1, then A=2 and x=0.1, and the resulting vector G may have the value specified by Equation 6 below:

$$G(102.1) = \{0,0,0.9,0.1,0,0,0,0,0,0,0\} \quad \text{(Eq. 4)}$$

Additionally or alternatively, in some implementations, the weights w in the weighting vector 410 may be resolved by using a second order interpolator. A second order interpolator solves for a curve of the form:

$$f(x) = a_0 + a_1 x + a_2 x^2 \quad \text{(Eq. 5)}$$

The values for $a_i$ can be found by solving 3 simultaneous equations, representing three consecutive frequencies $\{x_{n-1}, x_n, x_{n+1}\}$ as $\{-1, 0, 1\}$). The corresponding y values (e.g., values of equalizer taps in the matrix 214) may be $\{y_{n-1}, y_n, y_{n+1}\}$. The equations being solved may include:

$$y_{n-1} = f(-1) = a_0 - a_1 + a_2 \quad \text{(Eq. 6)}$$

$$y_n = f(0) = a_0 \quad \text{(Eq. 7)}$$

$$y_{n+1} = f(1) = a_0 + a_1 + a_2 \quad \text{(Eq. 8)}$$

$$\begin{bmatrix} y_{n-1} \\ y_n \\ y_{n+1} \end{bmatrix} = \begin{bmatrix} 1 & -1 & 1 \\ 1 & 0 & 0 \\ 1 & 1 & 1 \end{bmatrix} \begin{bmatrix} a_0 \\ a_1 \\ a_2 \end{bmatrix}$$ (Eq. 9)

Or $$[Y]=[M][A]$$ (Eq. 10)

Using linear algebra, values for A can be determined from the known values for Y (where Y is the matrix 214) by inverting the matrix M yields:

$$[A]=[M^{-1}][Y]$$ (Eq. 11)

Expressing Equation 7 in matrix form yields:

$$f(x)=a_0+a_1x+a_2x^2=[1\ x\ x^2][A]$$ (Eq. 12)

Making a substitution for A yields:

$$f(x)=a_0+a_1x+a_2x^2=[1\ x\ x^2][M^{-1}][Y]$$ (Eq. 13)

Substituting a new function yields:

$$f(x)=W(x)[Y]=[1\ x\ x^2][M^{-1}][Y]$$ (Eq. 14)

where W(x) is a 3-element row vector containing the weights applied to the 3 values of Y corresponding to the 3 values of x nearest the value of x desired. For instance, if the value if x is ⅓ of the way from $x_n$ to $x_{n+1}$ then the weights from W(⅓) would be applied to $\{y_{n-1}, y_n, y_{n+1}\}$.

Additionally or alternatively, in some implementations, the weight w in the weighting vector 410 can be resolved, for a given frequency fin the hoping range of the transmitter 201, by using a third-order interpolator having the form shown in Equation 17. The same general approach which is discussed above, with respect to the second-order interpolator, can be used in conjunction with the third-order interpolator, as well.

$$f(x)=a_0+a_1x+a_2x^2+a_3x^3$$ (Eq. 15)

Additionally or alternatively, in some implementations, the weights w in the weighting vector 410 can be resolved, for a given frequency fin the hopping range of the transmitter 201, by using a smoothing function. Smoothing functions are phase-linear, and predominantly low-pass in the frequency domain. The granularity of sampled function is typically finer, the weighting function is applied to more points, smoothing out some of the noise. Smoothing functions are essentially low pass Finite Impulse Response (FIR) filters. An advantage of smoothing functions is that the width of the filters can be adjusted. During initial acquisition, the width can be wide, covering a large number of samples with a rough resolution, and then changed to a finer window later to bring in additional detail. This method can be used to speed up how quickly the adaptive hopping equalizer 212 adapts.

Additionally or alternatively, in some implementations, the weights w in the weighting vector 410 can be resolved, for a given next frequency f by evaluating an exponential smoothing function having the form:

$$w(f,i)=k_1 e^{-k_2(f_n-fi)^2}$$ (Eq. 16)

in which $f_n$ represents a given next frequency, and ft is the frequency corresponding to the i-th column of the equalizer matrix.

As noted above, each row in the equalizer matrix 214 represents a function (or curve) for the values of a particular equalizer tap across a set of hopping frequencies. For example, the first row in the equalizer matrix 420 may represent the function for the first tap in the equalizer vector used by the equalizer 510 (shown in FIG. 5), the second row in the equalizer matrix 214 may represent the function for the second tap in the equalizer vector, the third row of the equalizer matrix 214 may represent the function for the third tap in the equalizer vector, and so forth. In this regard, applying, to the equalizer matrix 214, a set of weights that implement a smoothing function has the effect of: (1) smoothening each equalizer tap function that is represented (by the rows) in matrix 214, and (B) extracting, from the smoothened function, the coefficient value that corresponds to the next (hopping) frequency. By contrast, applying, to the equalizer matrix 214, a set of weights that implement an interpolator has the effect of interpolating each function that is represented in the matrix 214 to determine an respective interpolated equalizer tap that corresponds to the next (hopping) frequency. When the next (hopping) frequency is represented in the matrix 214, using an interpolator to derive the weighting vector 410 may result in one of the columns of the matrix 214 being extracted as is, whereas using a smoothing function to derive the weighting vector 410 may result in the calculation of a "smoothened" version of one of the columns in the matrix 214. Although in the present example an exponential smoothing function is used, it will be understood that the present disclosure is not limited to any specific type of smoothing function.

In some implementations, the equalizer vector 420 may have the form:

$$G(f)=\{g(f,k_1),g(f,k_2),(f,k_3),\ldots,g(f,k_M)\}$$ (Eq. 17)

in which G is the equalizer vector 420, f is the frequency corresponding to the coefficient vector, g is an equalizer tap, and k is the position of the equalizer tap within the equalizer vector 420. In some implementations, each equalizer tap g can be calculated in accordance with Equation 18 below:

$$g(f,k) = \sum_{i=1}^{M} w(f,i)y_{k,i}$$ (Eq. 18)

in which w(f, i) is the i-th weight the weighting vector 410 for the frequency f, and $y_{k,i}$ is the k-th equalizer coefficient (identified in the matrix 214) for one of the discrete frequency values in the set F.

Figure 5:
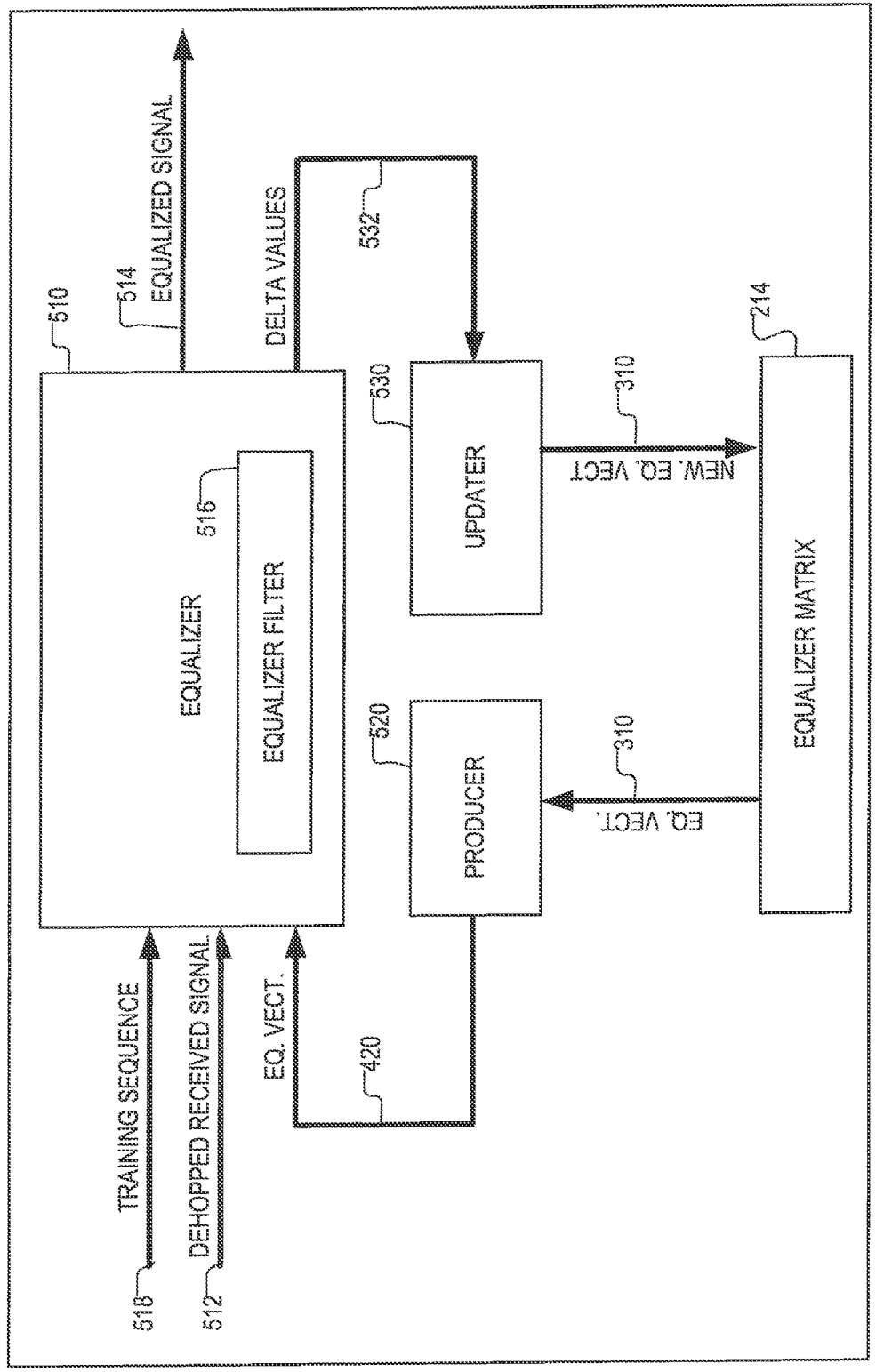
FIG. 5 is a diagram of the adaptive hopping equalizer of FIG. 2, according to aspects of the disclosure.
Figure 6:
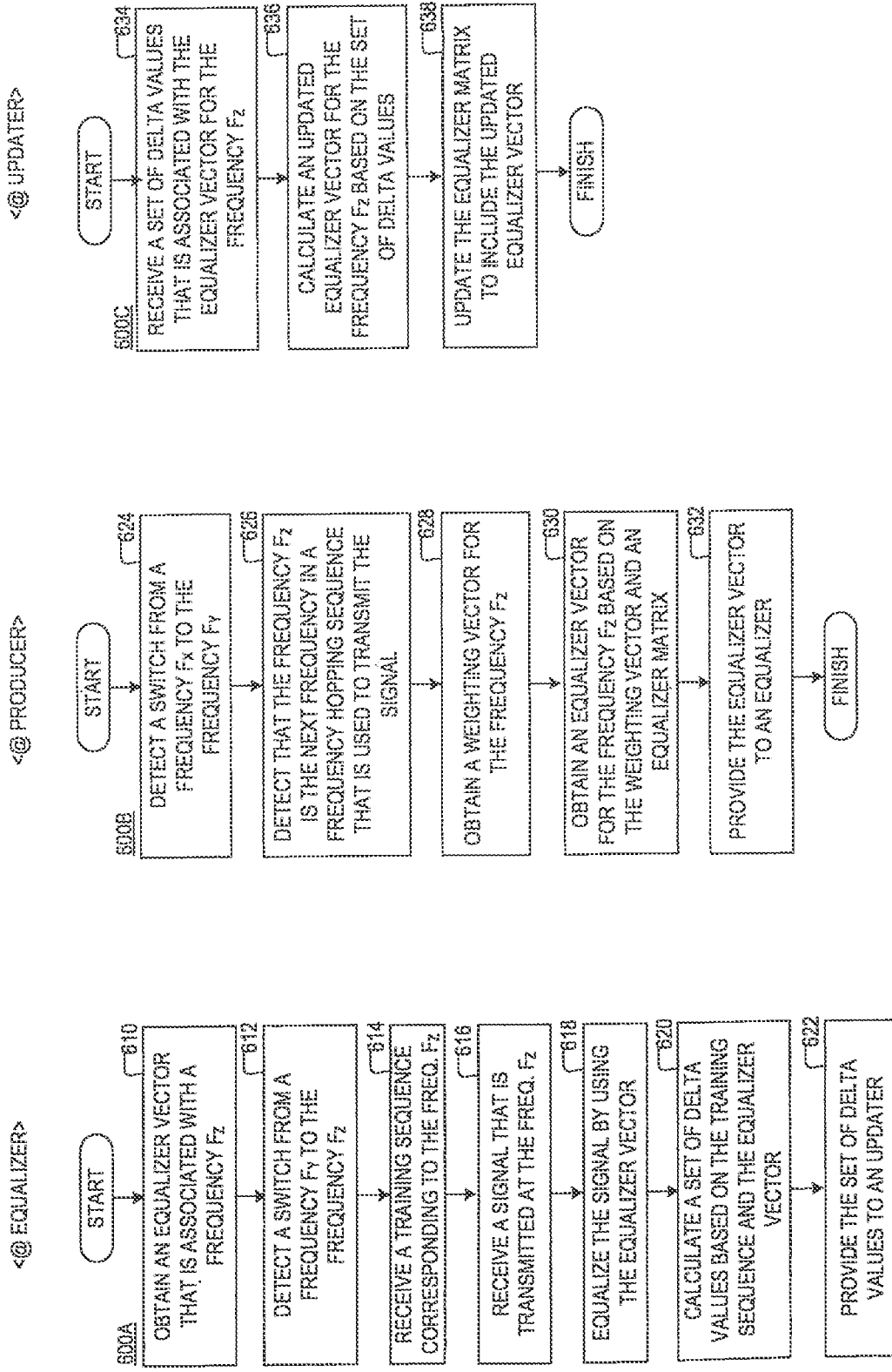
FIG. 6A is a flowchart of an example of a process that is performed by the adaptive hopping equalizer of FIG. 2, according to aspects of the disclosure.
FIG. 6B is a flowchart of an example of a process that is performed by the adaptive hopping equalizer of FIG. 2, according to aspects of the disclosure.
FIG. 6C is a flowchart of an example of a process that is performed by the adaptive hopping equalizer of FIG. 2, according to aspects of the disclosure.

FIG. 5 is a diagram of the adaptive hopping equalizer 212, according to aspects of the disclosure. As illustrated, the adaptive hopping equalizer 212 may include an equalizer 510, a producer 520, and an updater 530.

The equalizer 510 may include a Least Mean Squared (LMS) equalizer, a Decision Forward Equalizer (DFE), and/or any other suitable type of equalizer. It will be understood that the disclosure is not limited to any specific type of equalizer being used for the adaptive hopping equalizer 212. In operation, the equalizer 510 may receive a signal 512 and generate an equalized signal 514. The equalized signal 514 may be generated by the equalizer 510 by applying a filter 516 to the signal 512. The filter 516 may be arranged to equalize the signal 512 based on an equalizer vector 420. The equalizer vector 420 may be specific to a current hopping frequency at which the signal 512 is being transmitted by the transmitter 201. The equalizer vector may be provided to the equalizer 510 by the producer 520. In addition, the equalizer 510 may be configured to receive a training sequence 518. The training sequence 518 may be received from the receive circuitry 206. The training sequence 518 may include any suitable type of data that is known to the equalizer 510 (e.g., a signal burst preamble that is transmitted with the signal 512). The training sequence 518 can be used to generate a set of delta values 532, which identify the error (e.g., time error and/or gain error) that is incurred by the equalized signal 514 as a result of the application of the filter 516 on the training sequence. The operation of the equalizer 510 is discussed in further detail with respect to FIG. 6A.

The producer 520 may be configured to detect when a frequency hop is performed by the transmitter 201, which is the source of the signal 512, and identify a next hopping frequency in the hopping sequence that is used by the transmitter 201. After the next hopping frequency is identified, the producer may obtain equalizer vector 420 that corresponds to the next hopping frequency. The equalizer vector 420 may be obtained by using the matrix 214 in the manner discussed above with respect to FIG. 4. The equalizer vector 420 may be provided to the equalizer 510 before the transmitter 201 performs a hop to the next hopping frequency, so that the equalizer 510 can begin using the equalizer vector 420 immediately after the hop to the next hopping frequency is performed. The operation of the producer 520 is discussed in further detail with respect to FIG. 6B.

The updater 530 may be configured to receive the set of delta values 532 from the equalizer 510 and update the equalizer matrix 214 using Weight vector 410. The operation of the updater 530 is discussed further below with respect to FIG. 5C. More particularly, the equalizer matrix 214 can be gradually improved by the updater 520 based on delta values 532 received from the equalizer. In some implementations, when the receiver 200 is started, the version of the equalizer matrix 214 that is stored in the memory 210 may be one that was saved from previous operation of the receiver 200 and it can be subsequently improved by the updater 530. Additionally or alternatively, in some implementations, when the receiver 200 is started, the version of the matrix 214 that is stored in the memory 210 may be pre-adapted from some prior knowledge of the set of hopping frequencies that are used by the communication channel, and as such it may include a different column for each (or at least some) of the hopping frequencies in the set. Additionally or alternatively, in some implementations, when the receiver 200 is started, a default version of the matrix 200 may be stored in the memory 210 in which all columns are the same. In such implementations, the rows in the equalizer matrix 214 may be gradually substituted with values that are generated by the updater 530 in the manner discussed above.

Although in the example of FIG. 5 the equalizer 510, the producer 520, and the updater 530 are depicted as separate entities, it will be understood that alternative implementations are possible in which two or more of the equalizer 510, the producer 520, and the updater 530 are integrated into the same unit. Although in the present example, each of the equalizer 510, the producer 520, and the updater 530 are implemented in software, alternative implementations are possible in which any of the equalizer 510, the producer 520, and the updater 530 is implemented in hardware or as a combination of software and hardware. Although in the present example the training sequence 518 and the signal 512 are received via separate data streams, it will be understood that alternative implementations are possible in which they are received over the same data stream.

FIG. 6A is a flowchart of an example of a process 600A that is performed by the equalizer 510, according to aspects of the disclosure. At step 610, the equalizer 510 receives an equalizer vector 420 for a frequency $f_z$. At step 612, the equalizer 510 detects that the transmitter 201 has switched from transmitting at a frequency $f_y$ to transmitting at the frequency $f_z$. At step 614, the equalizer 510 receives the training sequence 518. At step 616, the equalizer 510 receives the signal 512. According to the present example, signal 512 is transmitted by transmitter 201 at the frequency $f_z$. At step 618, the equalizer 510 equalizes the signal 512 based on the equalizer vector 420 for the frequency $f_z$ and generates the equalized signal 514, as a result. Afterwards, the equalized signal 514 can be used by the processor 208 in any suitable fashion. At step 620, the equalizer 510 calculates a set of delta values based on the training sequence 518 and/or the equalizer vector 420. At step 622, the equalizer 510 provides the set of delta values to the updater 530.

FIG. 6B is a flowchart of an example of a process 600B that is performed by the producer 520, according to aspects of the disclosure. At step 624, the producer 520 detects a hop (by the transmitter 201) from a frequency $f_x$ to the frequency $f_y$. In some implementations, the hop may be detected based on a signal that is provided to the equalizer 212 (and/or producer 520) by a modem and/or another physical (or logical) component of the receiver 200. It will be understood that the present disclosure is not limited to any specific method for detecting the hop by the producer 520. At step 626, the producer 520 identifies the next frequency in a frequency hopping sequence that is used by the transmitter 201. According to the present example, the producer 520 detects that the frequency $f_z$ is the next frequency in the hopping sequence. At step 628, the producer 520 obtains a weighting vector 410 for the next frequency (i.e., the frequency $f_z$). In some implementations, obtaining the weighting vector 410 may include retrieving the weighting vector 410 from the memory 210. Additionally or alternatively, in some implementations, obtaining the weighting vector 410 may include calculating the weighting vector in the manner discussed above with respect to FIG. 4. At step 630, the producer 520 obtains an equalizer vector 420 for the frequency $f_z$ based on the weighting vector 410 for the frequency $f_z$. In some implementations, obtaining the equalizer vector 420 may include retrieving the equalizer vector 420 from the memory 210. Additionally or alternatively, in some implementations, obtaining the equalizer vector 420 may include multiplying the weighting vector 410 by the equalizer matrix 214. At step 632, the producer 520 provides the equalizer vector 420 to the equalizer 510.

FIG. 6C is a flowchart of an example of a process 600C that is performed by the updater 530, according to aspects of the disclosure. At step 634, the updater 530 receives the set of delta values 532 from the equalizer 510. At step 636, the updater 530 calculates an updated equalizer vector 310 for the frequency $f_z$ based on the set of delta values 532. At step 638, the updater 530 updates the equalizer matrix 214 to include the updated equalizer vector 310. In some implementations, when the equalizer matrix 214 already includes an equalizer vector 310 for the frequency $f_z$, updating the equalizer matrix 214 may include overwriting the existing equalizer vector 310 with the updated equalizer vector 310. Alternatively, when the equalizer matrix 214 does not include an equalizer vector 310 for the frequency $f_z$, updating the equalizer matrix 214 may include adding the updated equalizer vector 310 to the matrix 214, which effectively expands the set F of frequencies that are represented in the matrix 214.

According to the present example, the transmitter 201 is arranged to change hopping frequencies in a sequence that is known to the receiver 200. Frequencies $f_x$, $f_y$, and $f_z$, are positioned one after another in the sequence. According to the present example, the term "next frequency" refers to a frequency f in the sequence, which is going to be used after (e.g., immediately after) the hopping frequency that is currently used for the transmission of signals by the transmitter 201. In this regard, the frequency $f_f$ is identified as a "next frequency" at step 626, before the transmitter 201 switches to using this frequency for the transmission of signals. Furthermore, the equalizer vector 420 for the frequency $f_z$ is received by the equalizer 510 (at step 610) before the transmitter 510 has begun transmitting signals at the frequency $f_z$.

According to aspects of the disclosure, the training sequence 518 received by the equalizer 510 may include a synchronization sequence that is transmitted by the transmitter 201 to align time and phase of the received signal. The synchronization sequence may be transmitted when a switch is performed from the frequency $f_y$ to the frequency $f_z$. Although in the present example the synchronization sequence is transmitted at the front of the hop, alternative implementations are possible in which the synchronization sequence is transmitted anywhere in the hop. Irrespective of when it is transmitted, because the content of the synchronization sequence is known by the receiver beforehand, it can be used as a training sequence by the updater 530. Furthermore, it will be understood that alternative implementations are possible in which the training sequence includes another sequence that is stored in a memory of the equalizer 510. In this regard, the training sequence may include any suitable type of data that is known to the equalizer 510, which permits the equalizer 510 to measure distortion that is imparted on the data (e.g., a time error and/or a gain error), as a result of applying the filter 516 on the data.

In some implementations, the set of delta values may be generated by the equalizer 510. For instance, after equalizing a hop of signal, the adaptive equalizer may generate an improved set of coefficients, and calculate the delta values by taking the difference between the improved set of equalizer coefficients and the set of equalizer coefficients used to equalize the signal. The updater 530 may subsequently update the equalizer matrix 214 based on the set of delta values, through Equation 19, below:

$$y_{k,i}^+ = y_{k,i} + \Delta_k w(f,i) \quad \text{(Eq. 19)}$$

where $y_{k,i}$ is a current value for the element of the eq matrix for the kth row (kth coefficient or tap) and the i-th column (i-th frequency), $y_{k,i}^+$ is the updated value, $\Delta_k$ is the k-th value from the column vector delta provided by the adaptive eq, and w(f, i) is i-th element of the weighting function used for the current hop.

Figure 7:
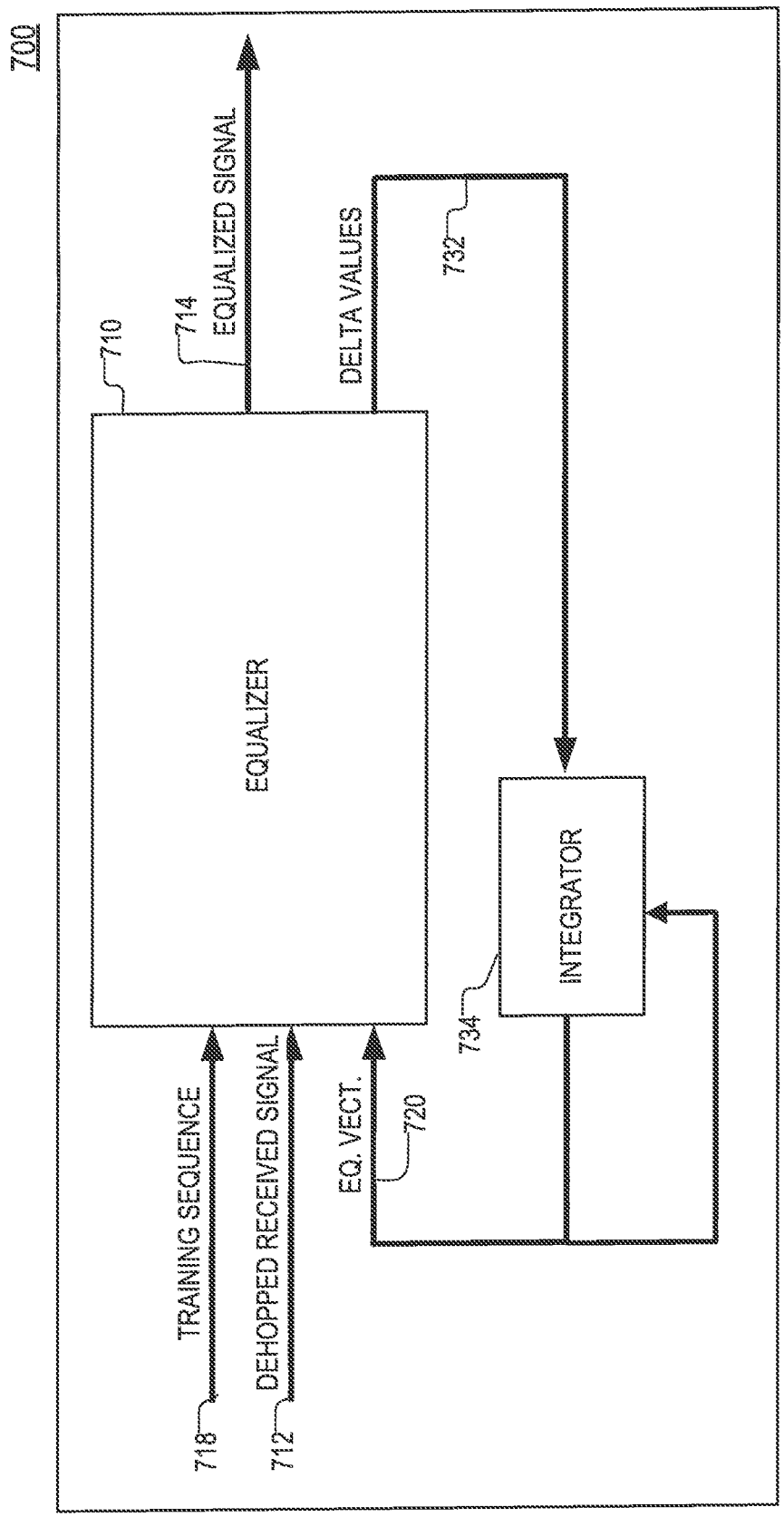
FIG. 7 is a diagram of an equalizer, in accordance with the prior art.

FIG. 7 depicts an example of a conventional single-channel equalizer 700. As illustrated, the equalizer 700 may be configured to generate an equalized signal 714 based on a dehopped signal 712 and an equalizer vector 720. Furthermore, the equalizer may be configured to produce delta values 732 and continuously update the equalizer vector 720 based on the delta values 732. The equalizer vector 720 may be updated by using an integrator 734, as shown. Unlike the equalizer 212, which is discussed with respect to FIG. 5, the equalizer 700 does not utilize a producer and an updater to generate an updated equalizer vector.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used throughout the disclosure, the term product may include a physical object that is being bought and sold, a service, and/or anything else that can be purchased and solved.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
   detecting a first hop to a first frequency in a hopping sequence, the first hop being performed by a transmitter in accordance with the hopping sequence;
   identifying a weighting vector that corresponds to a second frequency in the hopping sequence;
   obtaining an equalizer vector for the second frequency based on the weighting vector and an equalizer matrix, the equalizer matrix including a plurality of equalizer vectors, each equalizer vector corresponding to a different frequency in the hopping sequence;
   detecting a second hop from the first frequency to the second frequency, the second hop being performed by the transmitter in accordance with the hopping sequence;
   receiving a signal that is transmitted by the transmitter at the second frequency; and
   equalizing the signal by using the equalizer vector for the second frequency.

2. The method of claim 1, wherein:
   the equalizer vector for the second frequency is obtained by multiplying the weighting vector by the equalizer matrix, and
   the equalizer vector for the second frequency is obtained in response to the first hop, before the second hop is performed by the transmitter.

3. The method of claim 1, wherein:
   the weighting vector is obtained by evaluating a weighting function based on one or more frequencies that are represented in the equalizer matrix,
   the weighting vector is obtained in response to the first hop, before the second hop is performed by the transmitter.

4. The method of claim 1, wherein the weighting vector includes a plurality of weights, such that a sum of the plurality of weights is unity.

5. The method of claim 1, wherein implements one of an interpolating function and a smoothing function.

6. The method of claim 1, wherein the weighting vector includes a sequence of equalizer taps, and equalizing the signal includes applying a finite impulse response filter on the signal, the finite impulse response filter being based on the sequence of equalizer taps.

7. The method of claim 1, further comprising:
   calculating a set of delta values based on the equalizer vector for the second frequency, the set of delta values identifying an error that is incurred by the signal when the signal is equalized based on the equalizer vector for the second frequency;
   recalculating the equalizer vector for the second frequency based on the set of delta values; and
   adding the recalculated equalizer vector for the second frequency to the equalizer matrix.

8. The method of claim 1, wherein, when the equalizer matrix contains an equalizer vector corresponding to the second frequency, the weighting vector is arranged to extract the equalizer vector corresponding to the second frequency from the equalizer matrix, without interpolating any equalizer vectors that are part of the equalizer matrix.

9. A system, comprising:
   a memory configured to store an equalizer matrix including a plurality of equalizer vectors, each equalizer vector corresponding to a different frequency in a hopping sequence; and
   a processing circuitry operatively coupled to the memory, the processing circuitry being configured to perform the operations of:
   detecting a first hop to a first frequency in the hopping sequence, the first hop being performed by a transmitter in accordance with the hopping sequence;
   identifying a weighting vector that corresponds to a second frequency in the hopping sequence, the weighting vector being arranged to interpolate two or more of the equalizer vectors in the equalizer matrix when none of the equalizer vectors in the equalizer matrix corresponds to the second frequency;
   obtaining an equalizer vector for the second frequency based on the weighting vector and the equalizer matrix;
   detecting a second hop from the first frequency to the second frequency, the second hop being performed by the transmitter in accordance with the hopping sequence;
   receiving a signal that is transmitted by the transmitter at the second frequency; and equalizing the signal by using the equalizer vector for the second frequency.

10. The system of claim 9, wherein:
the equalizer vector for the second frequency is obtained by multiplying the weighting vector by the equalizer matrix, and
the equalizer vector for the second frequency is obtained in response to the first hop, before the second hop is performed by the transmitter.

11. The system of claim 9, wherein:
the weighting vector is obtained by evaluating a weighting function based on one or more frequencies that are represented in the equalizer matrix,
the weighting vector is obtained in response to the first hop, before the second hop is performed by the transmitter.

12. The system of claim 9, wherein the weighting vector includes a plurality of weights, such that a sum of the plurality of weights is unity.

13. The system of claim 9, wherein the weighting vector implements one of an interpolating function and a smoothing function.

14. The system of claim 9, wherein the weighting vector includes a sequence of equalizer taps, and equalizing the signal includes applying a finite impulse response filter on the signal, the finite impulse response filter being based on the sequence of equalizer taps.

15. The system of claim 9, further comprising:
calculating a set of delta values based on the equalizer vector for the second frequency, the set of delta values identifying an error that is incurred by the signal when the signal is equalized based on the equalizer vector for the second frequency;
recalculating the equalizer vector for the second frequency based on the set of delta values; and
adding the recalculated equalizer vector for the second frequency to the equalizer matrix.

16. The system of claim 9, wherein, when the equalizer matrix contains an equalizer vector corresponding to the second frequency, the weighting vector is arranged to extract the equalizer vector corresponding to the second frequency from the equalizer matrix, without interpolating any equalizer vectors that are part of the equalizer matrix.

17. A non-transitory computer-readable medium storing one or more processor-executable instructions, which when executed by at least one processor cause the at least one processor to perform the operations of:
detecting a first hop to a first frequency in a hopping sequence, the first hop being performed by a transmitter in accordance with the hopping sequence;
identifying a weighting vector that corresponds to a second frequency in the hopping sequence;
obtaining an equalizer vector for the second frequency based on the weighting vector and an equalizer matrix, the equalizer matrix including a plurality of equalizer vectors, each equalizer vector corresponding to a different frequency in the hopping sequence;
detecting a second hop from the first frequency to the second frequency, the second hop being performed by the transmitter in accordance with the hopping sequence;
receiving a signal that is transmitted by the transmitter at the second frequency; and
equalizing the signal by using the equalizer vector for the second frequency.

18. The non-transitory computer-readable medium of claim 17, wherein:
the equalizer vector for the second frequency is obtained by multiplying the weighting vector by the equalizer matrix, and
the equalizer vector for the second frequency is obtained in response to the first hop, before the second hop is performed by the transmitter.

19. The non-transitory computer-readable medium of claim 17, wherein:
the weighting vector is obtained by evaluating a weighting function based on one or more frequencies that are represented in the equalizer matrix,
the weighting vector is obtained in response to the first hop, before the second hop is performed by the transmitter.

20. The non-transitory computer-readable medium of claim 17, wherein the weighting vector implements one of an interpolating function and a smoothing function.

* * * * *